3,651,218
ANTIFUNGAL COMPOSITIONS

Morris Emmanuel Stolar, Trumbull, and Assad Sami Sawaya, West Haven, Conn., assignors to Miles Laboratories, Inc., Elkhart, Ind.
No Drawing. Continuation of application Ser. No. 742,494, July 5, 1968, which is a continuation-in-part of application Ser. No. 517,059, Dec. 28, 1965. This application June 3, 1970, Ser. No. 43,182
Int. Cl. A61k 21/00
U.S. Cl. 424—120
3 Claims

ABSTRACT OF THE DISCLOSURE

Composition and process utilizing a combination of nystatin and an 8-hydroxyquinoline compound which combination shows antifungal activity when used as a dermatological.

---

The is a continuation of copending U.S. application Ser. No. 742,494, filed July 5, 1968, and now abandoned, which is a continuation-in-part of U.S. application Ser. No. 517,059 filed Dec. 28, 1965, and now abandoned.

The present invention relates to topical antifungal compositions. In one of its more particular aspects, it relates to novel compositions comprising nystatin and an 8-hydroxy-quinoline compound which show improved antifungal activity. In another aspect it relates to a process for treating certain topical fungal infections using the hereinabove noted compositions.

It is an object of the present invention to provide novel combinations of compounds which exert antifungal activity in mammals such as rabbits, mice, dogs and the like. Other objects will be elucidated from the ensuing disclosure and the claims appended thereto.

Nystatin is an antifungal substance isolated from cultures of *Streptomyces noursei*, the exact chemical structure of which has not yet been fully determined. This remarkable antibiotic compound is known in the art of dermatology to be highly effective in combating nonilial infections caused by the organism Candida and specifically *Candida albicans*. In addition to its effectiveness as an antibiotic, this material is relatively non-toxic and is free from acquired resistance problems.

As effective as nystatin has been found to be, it has now unexpectedly been discovered that a novel combination of nystatin and an 8-hydroxyquinoline compound (hereafter called an oxine) exerts improved antifungal activity. An explanation of why the nystatin antifungal activity is potentiated by the addition thereto of an oxine compound is not yet available. However, it is believed that somehow the permeability of the fungus cell membrane is changed, permitting easier transport of the antifungal material into the cell and resulting in faster cidal action.

The compositions of the present invention are usually made to contain from about 40,000 units nystatin per gram of composition to about 400,000 units nystatin per gram of composition with a preferable nystatin concentration of about 120,000 units per gram of composition.

The oxine component of the present invention may be either the free base or a pharmaceutically acceptable salt form, such as 8-hydroxyquinoline citrate, 8-hydroxyquinoline sulfate, 8-hydroxyquinoline acetate, 8-hydroxyquinoline benzoate, 8-hydroxyquinoline salicylate and the like. One of the remarkable aspects of the present invention is the concentration at which the oxine compound has been found to be effective in exerting its potentiating activity in conjunction with nystatin. In this respect the optimum concentration of oxine has been found to be as low as about 0.1% by weight. In preparing the compositions of the present invention, from about 0.1% by weight to about 1.0% by weight of oxine may be used with a preferable range of from about 0.1% by weight to about 0.6% by weight.

The compositions of the present invention may be prepared in the form of ointments, lotions and creams. The ointment form of the composition usually utilizes a non-aqueous base material. This base material may be any of the various non-aqueous vehicles utilized by those experienced in the art of compounding dermatological preparations such as, for example, petrolatum, mineral oil, corn oil and the like. In addition to utilizing these materials alone as the base vehicle for the present composition, various other additives may be used in combination therewith. It has been found particularly advantageous to utilize, as a base additive, a material such as a modified montmorillinite. This is an argillaceous material which is the result of a cation exchange reaction between an organic base and bentonite. Its use enables the obtention of a gel base from a liquid organic material such as mineral oil. Certain of the modified clay additives also impart thixotropicity to the ointment base.

In addition to ointments, the nystatin-oxine compositions of the present invention may be utilized in the form of aqueous suspensions. These aqueous suspesions are usually used as lotions. In another useful form the oxine compound and an aqueous suspension of the nystatin are combined with various adjuvants to form a cream. In this application the nystatin suspension may be combined with a minor amount of hydrophobic substances to achieve the desired cream form.

In addition to the above ingredients, various other medicaments and adjuvants may be added to the compositions of the present invention. The medicaments include the anti-inflammatory steroids such as hydrocortisone and prednisolone, skin softeners, such as isopropyl myristate, and the like. In this respect hydrocortisone may be present in a proportion of from about 0.25% to about 5% by weight and preferably about 0.5% by weight. Because of the wide variation in potency of the anti-inflammatory steroids, the concentration of such a steroid must be varied according to the particular steroid used.

When the nystatin is used in the form of an aqueous suspension, the compositions of the present invention are preferably adjusted to a pH range of from about 4 to about 6. Such pH adjustment may be accomplished by the use of any of the various topically and pharmaceutically acceptable acids and bases.

In addition to the above medicaments and adjuvants which may be added to the compositions of the present invention, various preservatives such as propylparaben, methylparaben and sorbic acid may also advantageously be added to the present compositions. In this same respect various wetting agents, thickening agents, cream bases, and other adjuvants may be added in order to achieve the desired physical constitution and elegance desired for the present compositions.

The compositions of the present invention have been found to be useful in treating certain dermatological infections and as such the compositions simply act as fungicides, that is, various type growths are arrested and sterilized. Particularly the compositions of the present invention have been found to exert their activity toward the organism *Candida albicans*. In testing for antifungal activity this organism has been found to be fairly representative and any cidal activity toward *Candida albicans* is indicative of the general antifungal activity of the particular composition. In this regard compositions utilizing nystatin alone have been found to be incapable of sterilizing a culture of *Candida albicans* in a time interval of four hours. In startling contrast to this, it has been found that by including an oxine compound with the nystatin the same culture of *Candida albicans* can be sterilized in from about 15 minutes to about 60 minutes.

The compositions of the present invention are useful in cated an observed growth of one or more colonies of *Candida albicans*. A negative sign indicates the absence of *Candida albicans*.

TABLE 1

| Example No. | Composition | | | | Growth of *C. albicans* Exposure time in minutes | | | | | |
|---|---|---|---|---|---|---|---|---|---|---|
| | Nystatin | | 8-hydroxyquinoline | | 0 | 15 | 30 | 60 | 120 | 240 |
| | Units | Percent | Percent | Salt | | | | | | |
| 1* | 0 | | 0 | | + | + | + | + | + | + |
| 2 | 40,000 | (1) | 0 | | + | + | + | + | + | + |
| 3 | 120,000 | (3) | 0 | | + | + | + | + | + | + |
| 4 | 400,000 | (10) | 0 | | + | + | + | + | + | + |
| 5 | 800,000 | (20) | 0 | | + | + | + | − | − | − |
| 6 | 0 | | 0.3 | Citrate | + | + | + | + | + | + |
| 7 | 0 | | 1.0 | Acetate | + | + | + | + | + | + |
| 8 | 0 | | 1.0 | Benzoate | + | + | + | + | + | + |
| 9 | 120,000 | (3) | 0.1 | Citrate | + | + | + | − | − | − |
| 10 | 120,000 | (3) | 0.3 | do | + | + | + | − | − | − |
| 11 | 120,000 | (3) | 1.0 | do | + | + | + | − | − | − |
| 12 | 120,000 | (3) | 1.0 | Acetate | + | + | + | − | − | − |
| 13 | 120,000 | (3) | 1.0 | Sulfate | + | + | + | − | − | − |
| 14 | 120,000 | (3) | 1.0 | Benzoate | + | + | + | − | − | − |

*Ointment base—used as a control.

treating fungal infections and as such, the compositions are convenient for topical application. As used herein such topical use entails the application of the composition directly to the infected area as opposed to a systemic utilization of a particular medicament. In regard to frequency in amount of application, this, of course, depends on the concentration of the medicament, the relative efficiency of the antifungal composition and the severity of the infection. Generally speaking, however, the compositions of the present invention are applied liberally to the infected area two to four times daily until the infection is cleared. This facet is usually within the scope and discretion of one skilled in the art of dermatology and particularly one skilled in treating fungal infections.

The following examples will illustrate the method of preparation of the compositions of the present invention as well as the improved activity of such compositions. These examples, however, are not to be construed as placing any limitation on the present invention except as in the present disclosure and the claims appended thereto.

EXAMPLES 1–14

In the following examples ointments were prepared, using a petrolatum base, to contain the constituents indicated in Table 1. These various compositions were tested for antifungal activity by means of a modified speed-of-kill test and the rate of cidal acitivity was used as an indication of effectiveness.

The test procedure was performed by weighing 1.0 g. of each sample aseptically into a sterile 125 ml. Erlenmeyer flask which was warmed gently to disperse and form a uniform layer of the test composition on the bottom of the flask. To the flask, 5.0 ml. of sterile saline test solution U.S.P. was gently added and followed by 0.5 ml. of an inoculum culture of *Candida albicans* ATCC (American Type Culture Collection) No. 752. Approximate uniformity of inoculum was obtained by growing *Candida albicans* in fluid Sabouraud medium for 24 hours at 30°–32° C. prior to the addition to the sample. The flasks were then placed in a water bath at 37° C. and slight mechanical agitation was used to insure equal distribution of the ingredients therein. By means of a sterile platinum transfer loop an amount of each sample was then transferred at the particular time intervals indicated in Table 1 to 100 ml. of fluid Sabouraud medium and incubated at 32° C. for 48 hours. After this incubation period the fluid was examined for the presence of organism growth. Table 1 indicates the results of such tests. A positive sign indi-

EXAMPLE 15

In order to determine the quantitative cidal activity of the combination of nystatin and 8-hydroxyquinoline toward *Candida albicans* as compared to each ingredient individually, the ointments of Examples 1, 3, 6 and 10 were contacted with a culture of the organism having about $10^7$ colonies per ml. After 30 minutes the number of survivors in each case were counted. Those cultures contacted with the ointments of Examples 1 and 6 (control base and 0.3% 8-hydroxyquinoline citrate) each showed no reduction of viable count while the ointment of Example 3 (3% nystantin alone) showed a reduction to about $10^5$ survivors per ml. In contrast to this the culture contacted with the ointment of Example 10 (3% nystantin–0.3% 8-hydroxyquinoline) showed a count of only about $10^3$ survivors per ml.

In summary the present invention provides a novel combination of ingredients comprising nystatin and anoxine compound as a potentiator therefor. These compositions show remarkable activity as compared to their individual activities and provide a new and novel means for combating fungal infections.

What is claimed is:

1. A composition having improved fungicidal activity toward Candida organisms comprising about 120,000 units per gram of nystantin and about 1.0% by weight of 8-hydroxyquinoline acetate.

2. A composition having improved fungicidal activity toward Candida organisms comprising about 120,000 units per gram of nystatin and about 1.0% by weight of 8-hydroxyquinoline benzoate.

3. A composition having improved fungicidal activity toward Candida organisms comprising about 120,000 units per gram of nystatin and about 0.3% by weight of 8-hydroxyquinoline citrate.

References Cited

N.N.D., New and Nonofficial Drugs, J. B. Lippincott Co., Philadelphia, Pa., 1964, pp. 138 and 139.

Merck Index, Merck and Co., Inc., Rahway, N.J., 7th ed., 1960, p. 545.

American Drug Index, J. B. Lippincott Co., Philadelphia, Pa., 1964, p. 477.

JEROME D. GOLDBERG, Primary Examiner

U.S. Cl. X.R.

424—258